United States Patent
Guillot

(10) Patent No.: US 7,410,607 B2
(45) Date of Patent: Aug. 12, 2008

(54) METHOD OF INSULATING A CASE OF A SOLID PROPELLANT ROCKET MOTOR

(75) Inventor: David G. Guillot, Tremonton, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 357 days.

(21) Appl. No.: 10/938,446

(22) Filed: Sep. 10, 2004

(65) Prior Publication Data

US 2005/0028514 A1 Feb. 10, 2005

Related U.S. Application Data

(62) Division of application No. 09/747,192, filed on Dec. 21, 2000, now Pat. No. 6,893,597.

(60) Provisional application No. 60/171,619, filed on Dec. 23, 1999.

(51) Int. Cl.
*B29C 70/02* (2006.01)
*B29C 70/28* (2006.01)
(52) U.S. Cl. .................. 264/241; 264/238; 264/328.18
(58) Field of Classification Search .............. None
See application file for complete search history.

(56) References Cited

U.S. PATENT DOCUMENTS

| | | | |
|---|---|---|---|
| 3,301,785 A * | 1/1967 | Ratliff et al. ............... 252/62 |
| 3,459,701 A * | 8/1969 | Sayers et al. .............. 523/138 |
| 3,550,201 A * | 12/1970 | Chapman ............... 425/192 R |
| 3,908,061 A | 9/1975 | Byrne et al. |
| 4,369,297 A | 1/1983 | Bilow |
| 4,433,020 A | 2/1984 | Narukawa et al. |

(Continued)

FOREIGN PATENT DOCUMENTS

EP 172 957 A1 3/1986

(Continued)

OTHER PUBLICATIONS

Buss Kneader Operating Principle, http:/www.busscompounding.com/Seiten/English/Buss%20Kneader/kneader1.htm, Dec. 3, 1999.

*Primary Examiner*—Edmund H. Lee
(74) *Attorney, Agent, or Firm*—Traskbritt

(57) ABSTRACT

This method permits manufacturing EPDM rocket motor insulation in which carbon fibers are dispersed and immobilized in the EPDM polymeric matrix but are not excessively fractured or fragmentized, i.e., broken into smaller fragments, when encountering degrees of shear necessary to homogeneously or otherwise distribute or disperse the carbon fibers in the EPDM polymeric matrix. The method is substantially solvent free and is performed via distributive/reduced shear mixing to distribute the fragile carbon fibers into a rubber matrix without excessive damage. According to one embodiment, at least about 50% of the elastomer composition introduced into the mixing apparatus is liquid EPDM terpolymer having sufficiently low molecular weight and high diene content to permit dispersion of the carbon fibers in the EPDM without substantial fragmentation of the fibers. According to another embodiment, mixing takes place in a kneader capable of rotating a screw having a discontinuous screw thread about the screw axis while superimposing an axially reciprocating stroke to the screw. The kneader imparts low shear distributive mixing of the carbon fibers in the EPDM terpolymer.

11 Claims, 5 Drawing Sheets

U.S. PATENT DOCUMENTS

| | | | |
|---|---|---|---|
| 4,507,165 A | 3/1985 | Herring | |
| 4,640,861 A | 2/1987 | Binnersley et al. | |
| 4,663,065 A | 5/1987 | Herring | |
| 4,666,763 A | 5/1987 | King et al. | |
| 4,779,989 A * | 10/1988 | Barr | 366/90 |
| 4,956,397 A * | 9/1990 | Rogowski et al. | 523/138 |
| 4,980,233 A | 12/1990 | McCullough, Jr. et al. | |
| 4,997,716 A | 3/1991 | McCullough, Jr. et al. | |
| 4,999,238 A | 3/1991 | Gawin | |
| 5,019,450 A | 5/1991 | Cogswell et al. | |
| 5,038,561 A | 8/1991 | Chase | |
| 5,039,572 A | 8/1991 | Bobsein et al. | |
| 5,213,889 A | 5/1993 | Cogswell et al. | |
| 5,276,093 A | 1/1994 | Kitagawa et al. | |
| 5,344,689 A | 9/1994 | Ide et al. | |
| 5,352,312 A * | 10/1994 | Guillot | 156/172 |
| 5,399,599 A | 3/1995 | Guillot | |
| 5,498,649 A | 3/1996 | Guillot | |
| 5,629,371 A | 5/1997 | Kitagawa et al. | |
| 5,767,221 A | 6/1998 | Poulter et al. | |
| 5,821,284 A * | 10/1998 | Graham et al. | 523/179 |
| 5,830,384 A | 11/1998 | Stephens et al. | |
| 5,840,227 A * | 11/1998 | Bourdoncle et al. | 264/112 |
| 6,152,592 A * | 11/2000 | Klein | 366/80 |
| 6,566,420 B1 * | 5/2003 | Guillot et al. | 523/138 |
| 6,606,852 B1 | 8/2003 | Harvey et al. | |
| 6,709,147 B1 * | 3/2004 | Rauwendaal | 366/80 |

FOREIGN PATENT DOCUMENTS

| | | |
|---|---|---|
| EP | 172 957 B1 | 3/1986 |
| FR | 2554114 | 5/1985 |
| GB | 1301296 | 12/1972 |
| JP | 62-82007 * | 4/1987 |
| WO | WO 91/19754 | 12/1972 |

* cited by examiner

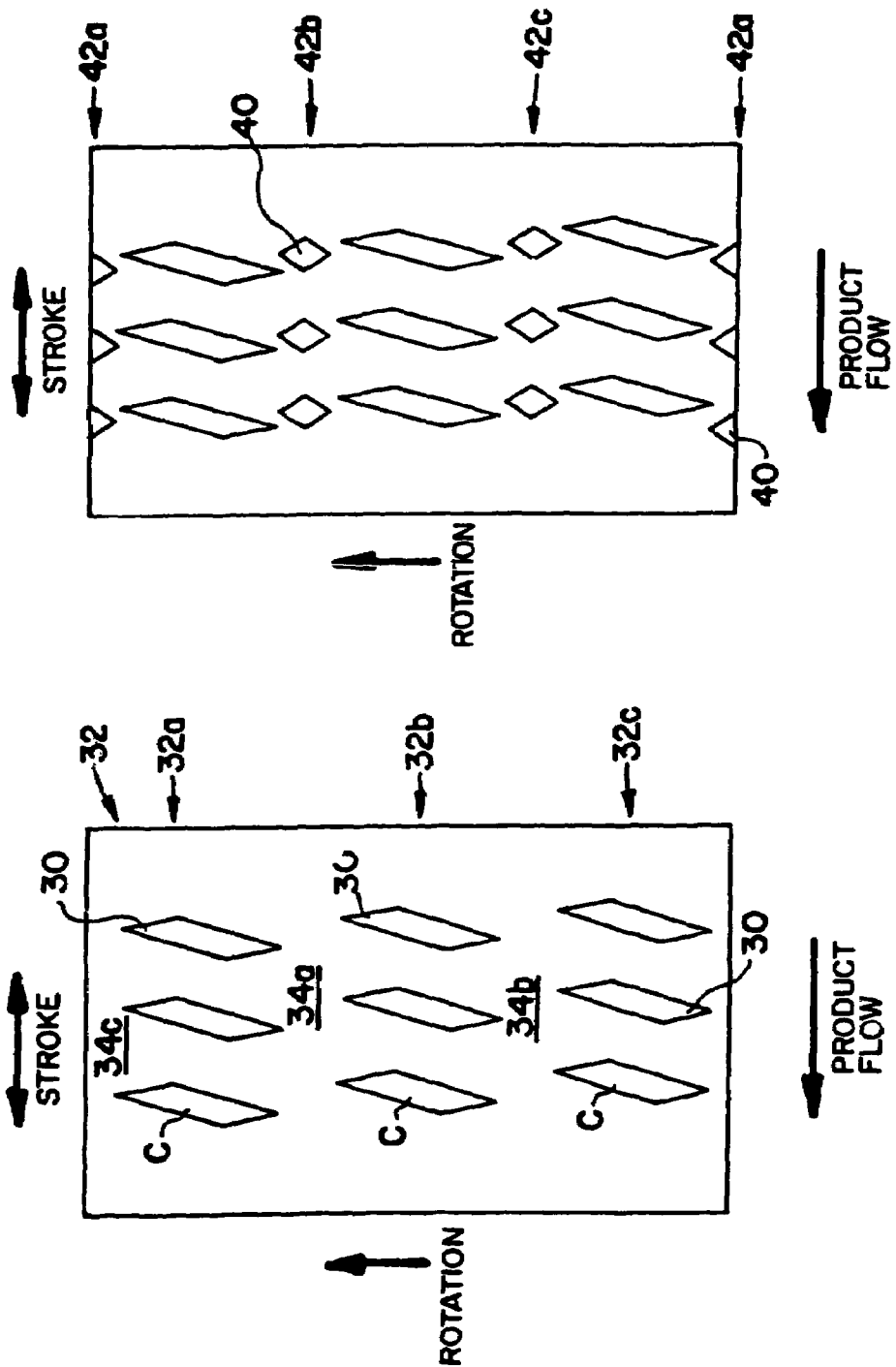

METHOD OF INSULATING A CASE OF A SOLID PROPELLANT ROCKET MOTOR

CROSS-REFERENCE TO RELATED APPLICATIONS

This application is a divisional of application Ser. No. 09/747,192, filed Dec. 21, 2000, now U.S. Pat. No. 6,893,597, issued May 17, 2005, which claims the benefit of U.S. Provisional Patent Application Ser. No. 60/171,619 filed in the U.S. Patent & Trademark Office on Dec. 23, 1999, now abandoned, the complete disclosure of which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided by the terms of F04611-97-C-0053 to the Air Force Rocket Laboratory.

BACKGROUND OF THE INVENTION

1. Field of the Invention

This invention is directed to a process for making elastomer-based insulation for rocket motors and, in particular, to a process in which fragile carbon fibers are mixed with and preferably homogeneously dispersed in ethylene propylene diene monomer (EPDM) without requiring the use of a volatile solvent for dissolution of EPDM during fiber incorporation. The insulation of this invention is especially useful for placement in the nozzle or case, including between a solid propellant grain and a rocket motor case for protecting the case from high temperatures experienced during burning of solid propellant grains.

2. State of the Art

Solid rocket motors typically include an outer case or shell housing a solid propellant grain. The rocket motor case is conventionally manufactured from a rigid, yet durable, material such as steel or filament-wound composite. The propellant is housed within the case and is formulated from a composition designed to undergo combustion and thereby produce the requisite thrust for attaining rocket motor propulsion.

During operation, a heat insulating layer (insulation) protects the rocket motor case from heat and particle streams generated by the combusting propellant. Typically, the insulation is bonded to the inner surface of the case and is generally fabricated from a composition capable of withstanding the high temperature gases produced when the propellant grain burns. A liner layer (liner) functions to bond the propellant grain to the insulating layer and to any noninsulated portions of the case, as well as to inhibit interfacial burning. Liner compositions are generally known to those skilled in the art. An exemplary liner composition and process of applying the same to a case is disclosed in U.S. Pat. No. 5,767,221, the complete disclosure of which is incorporated herein by reference to the extent that it is compatible with this specification.

The combustion of solid rocket propellant generates extreme conditions within the case of the rocket motor. For example, temperatures inside the rocket motor case typically reach 2,760° C. (5,000° F.) and interior pressures may exceed 1,500 psi. These factors combine to create a high degree of turbulence within the rocket motor case. In addition, particles are typically entrained in the gases produced during propellant combustion. Under the turbulent environment, these entrained particles can erode the rocket motor insulation. If the insulating layer and liner are pierced during rocket motor operation, the casing is susceptible to melting or degradation, which can result in failure of the rocket motor. Thus, it is crucial that insulation compositions withstand the extreme conditions experienced during propellant combustion and protect the case from the burning propellant. It is also crucial that insulation compositions possess acceptable shelf life characteristics such that they remain sufficiently pliable, without becoming fully cured, until used in application to the rocket motor casing. This requirement is essential because the production of a given lot of insulation may have to wait in storage for a number of months prior to use. Typically, the insulation may be stored in large rolls in an uncured, or at most, a partially cured, state until ready for use. A number of curing agents are well known and are conventionally employed but still must be compatible with the overall EPDM formulation to permit satisfactory shelf life. This in turn requires a balancing of curing agent activity.

In the past, attempts at producing insulating materials that would protect the rocket motor case focused on filled and unfilled rubbers and plastics, such as phenolic resins, epoxy resins, high temperature melamine-formaldehyde coatings, ceramics, polyester resins, and the like. These plastics, however, crack and/or blister as a result of the rapid temperature and pressure fluctuations experienced during combustion.

Elastomeric compositions have also been used as rocket motor insulation materials in a large number of rocket motors. The elastomeric compositions have been selected because their mechanical, thermal, and ablative properties are particularly suited for rocket motor applications. However, the ablative properties of elastomers are often inadequate for rocket motor operation. For example, insulation, whether thermosetting or thermoplastic, is characterized by relatively high erosion rates unless reinforced with a suitable filler. The criticality of avoiding such high erosion rates is demonstrated by the severity and magnitude of the risk of failure due to erosion. Most insulation is, of necessity, "man-rated," in the sense that a catastrophic failure can result in the loss of human life whether the rocket motor is used as a booster for launch of a space shuttle or is carried tactically underneath the wing of an attack aircraft. The monetary cost of failure in satellite launches is well publicized and can run into the hundreds of millions of dollars.

In order to improve the ablative properties of elastomeric compositions, it has been proposed to reinforce the elastomeric compositions with fillers, such as organic-based fibers or carbon fibers. For instance, an exemplary carbon fiber-filled rocket motor insulation composed of solid NORDEL® 1040 as the primary terpolymer is commonly known in the industry as the STW4-2868 thermal insulation and has the following composition:

TABLE A

STW4-2868 THERMAL INSULATION FORMULATION
(carbon fiber; parts by weight)

| Ingredient | Function | Parts by Weight |
|---|---|---|
| NORDEL ® 1040 | Primary EPDM terpolymer base | 80 |
| Neoprene FB | Secondary polymer base | 20 |
| Zinc oxide | Activator | 5 |
| Sulfur | Curative | 1 |
| HAF carbon black | Pigment | 1 |

TABLE A-continued

STW4-2868 THERMAL INSULATION FORMULATION
(carbon fiber; parts by weight)

| Ingredient | Function | Parts by Weight |
| --- | --- | --- |
| MBT | Accelerator | 1 |
| AGERITE ® Resin D | Antioxidant | 2 |
| AGERITE ® HPS | Antioxidant | 1 |
| TELLURAC ® | Accelerator | 0.50 |
| SULFADS ® | Accelerator | 0.75 |
| VCM carbon fibers | Filler | 41 |
| Total Parts by Weight | | 153.25 |

Although organic-based fibers can be dispersed within the EPDM without too much difficulty, the homogeneous dispersion of carbon fibers in an elastomeric composition presents a difficult processing problem. The mixing process is complicated by the fragility of the carbon fibers. Mixing of carbon fibers into a solid elastomer under high shear physically deteriorates the carbon fibers into smaller particles or shreds, thereby negating the advantageous physical attributes that the carbon fibers would otherwise have contributed to the insulation.

Conventionally, the problem of carbon fiber fragility has been addressed by dissolving the elastomer into a solution with an appropriate organic solvent to lower the viscosity of the elastomer or elastomer mixture. Suitable solvents include, by way of example, hydrocarbons such as hexanes, heptanes, and/or cyclohexane. The frangible graphitized carbon fibers can then be mixed with the solution in, for example, a sigma-blade mixer without significant breakage of or damage to the carbon fibers. The material is then sheeted out and the solvent is allowed to evaporate at ambient atmosphere or in an oven.

The use of solvent in this processing technique presents several drawbacks. For example, solvent processing techniques, such as those conventionally used to disperse carbon fibers in EPDM rubber, are relatively expensive. Material costs are increased by the use of solvents, as are processing costs, since additional workers and equipment are required to handle and process the solvents. Further, considerable costs and worker safety issues are associated with the disposal of hazardous volatile organic solvents.

Thus, although it has been long recognized that carbon fiber-filled EPDM is an excellent candidate for rocket motor insulation, a low cost and nonhazardous solvent-free synthesis route that produces EPDM insulation having carbon fibers homogeneously dispersed therein, but without being subject to significant breakage or damage would be desirable.

BRIEF SUMMARY OF THE INVENTION

Therefore, a method of manufacturing ethylene propylene diene monomer (EPDM) rocket motor insulation in which carbon fibers are dispersed and immobilized in the EPDM polymeric matrix, but are not excessively fractured or fragmentized, i.e., broken into smaller fragments, when encountering degrees of shear necessary to homogeneously or otherwise distribute or disperse the carbon fibers in the EPDM polymeric matrix is provided.

The method of the present invention is a substantially solvent-free method in which the insulation is manufactured via distributive/reduced shear mixing to distribute the fragile carbon fibers into a rubber matrix without excessive damage.

In accordance with one embodiment of this substantially solvent-free method, the elastomer composition comprises carbon fibers and EPDM terpolymer, at least 50 wt % of which is introduced as an ingredient into the mixing apparatus as liquid EPDM terpolymer having a sufficiently low molecular weight and high diene content to permit dispersion of the carbon fibers in the EPDM without substantial fragmentation of the fibers. As referred to herein, "liquid EPDM" means EPDM terpolymer that is flowable at room temperature. Suitable mixing apparatuses for this embodiment include sigma-blade and vertical-blade mixers. Certain kneaders, such as discussed below in connection with another embodiment of the inventive method, capable of superimposing a rotational and axial mixing motion to the carbon fibers can also be used.

In accordance with another embodiment of the invention, the elastomer composition is prepared, optionally under substantially solvent-free conditions with little or no liquid EPDM terpolymer, by use of a kneader capable of rotating a screw having a discontinuous screw thread about the screw axis while superimposing an axially reciprocating stroke to the screw. This kneader imparts low shear distributive mixing of the carbon fibers in the EPDM terpolymer. The kneader used in this embodiment is especially suitable where little or no liquid EPDM ingredient and no volatile solvent are included in the formulation.

As referred to herein, carbon fibers are fibers having been subject to at least substantial graphitization or carbonization, and preferably have about 98 wt % or more carbon content.

Other aspects and advantages of the invention will be more apparent to those skilled in the art upon reading the detailed description and appended claims, which when read in conjunction with the accompanying drawings, explain the principles of this invention.

BRIEF DESCRIPTION OF THE SEVERAL VIEWS OF THE DRAWINGS

The accompanying drawings serve to elucidate the principles of this invention. In such drawings:

FIG. 4 is a schematic view of an axial segment of a discontinuous screw barrel of the kneading apparatus of FIG. 2, with the axial segment section being projected onto a flat plane for explanatory purposes;

FIG. 5 is the schematic view of FIG. 4, with kneading pins of the kneading apparatus being superimposed onto the illustrated axial segment;

DETAILED DESCRIPTION OF THE INVENTION

Figure 1B:
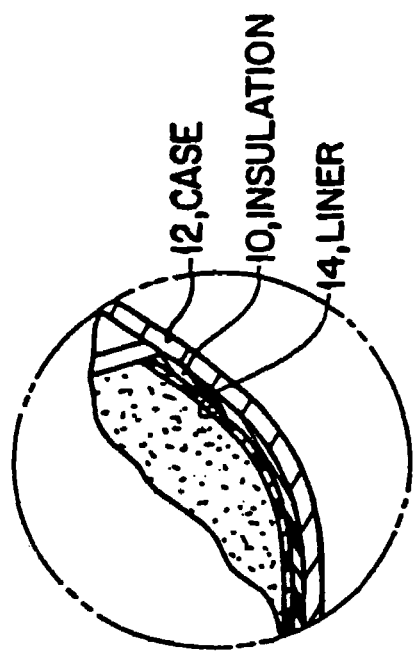
FIG. 1B is an enlarged schematic cross-sectional view of the area encircled and labeled "SEE FIG. 1B" in FIG. 1A.
Figure 1A:
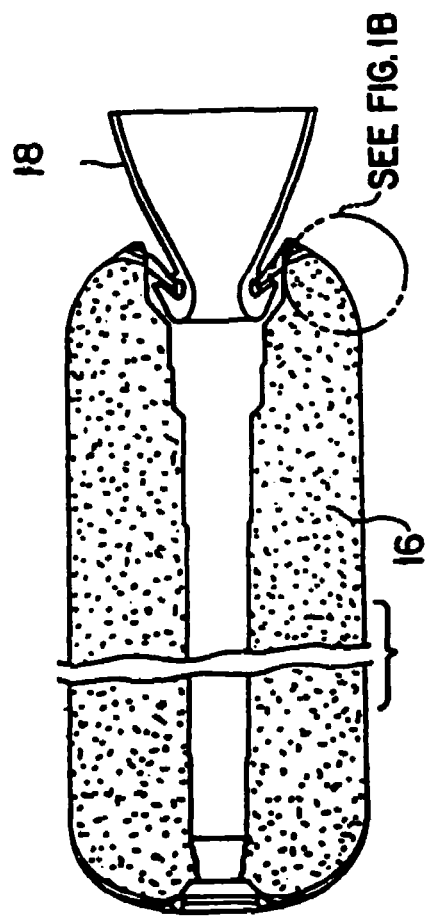
FIG. 1A is a schematic cross-sectional view of a rocket motor assembly in which the insulation is provided.
Figure 2:
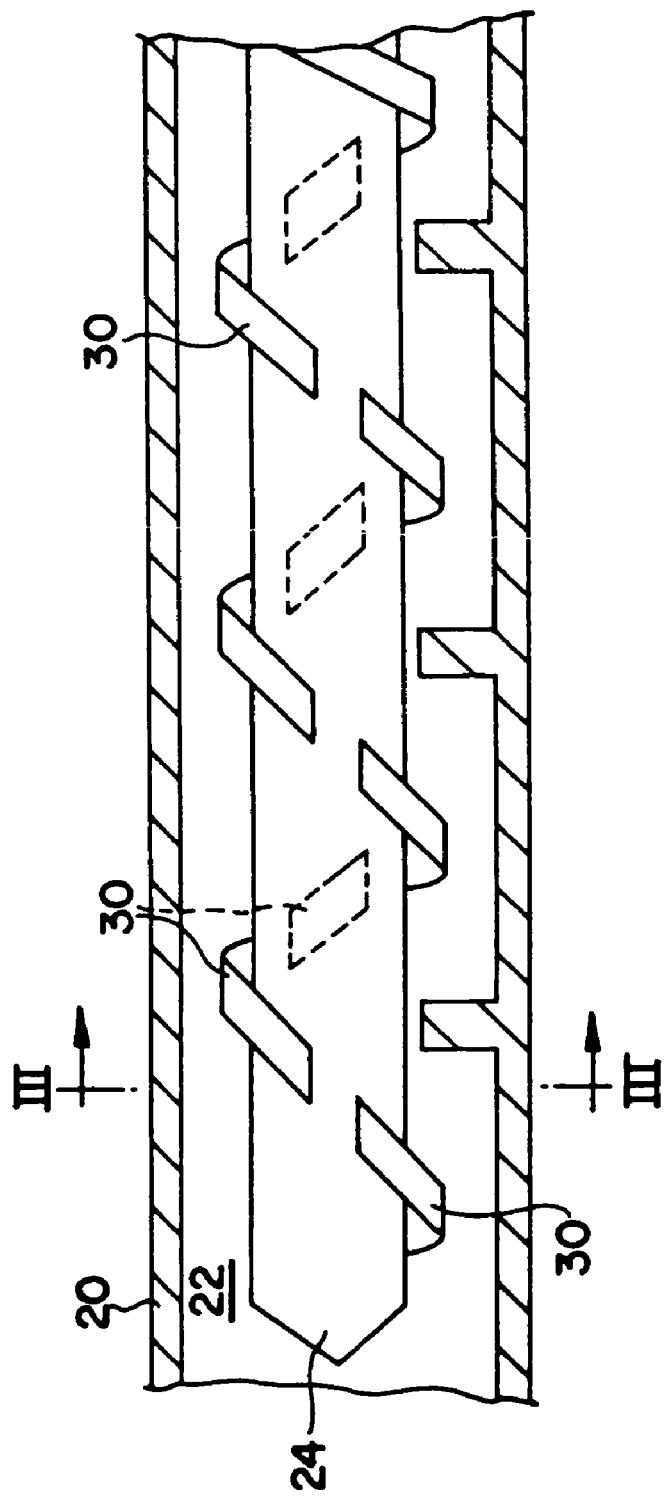
FIG. 2 is a schematic cross-sectional view of a kneading apparatus suited for use with this invention.
Figure 3:
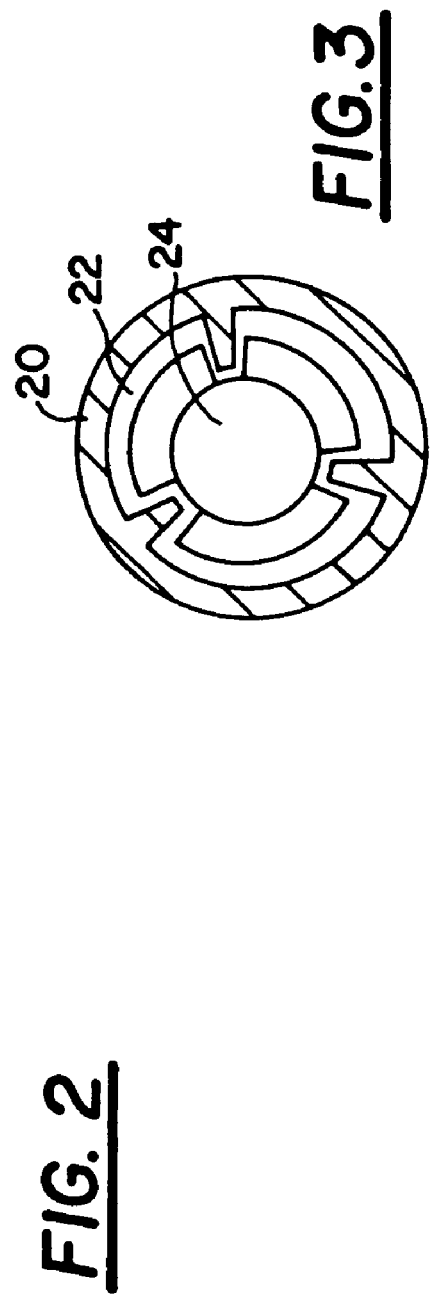
FIG. 3 is a cross-sectional view taken along sectional line III-III in FIG. 2.

The present insulation compositions 10, when in a cured state, are especially suited for disposal on the interior surface of the rocket motor case 12, as shown in FIGS. 1A and 1B. Typically, a liner 14 is interposed between the insulation composition 10 and propellant 16. The insulation composition 10 and the liner 14 serve to protect the rocket motor case 12 from the extreme conditions produced by the propellant 16 as it undergoes combustion reactions and is exhausted through nozzle assembly 18. Methods for loading a rocket motor case 12 with the insulation composition 10, the liner 14, and the propellant 16 are known to those skilled in the art, and can be readily adapted within the skill of the art without undue experimentation to incorporate the insulation composition 10 of this invention.

Unlike conventional techniques that make use of a solvent within a mixing apparatus to achieve adequate distribution of carbon fibers in solid EPDM ingredients without significant fiber fragmentation, the method of this invention achieves distribution of carbon fibers in an EPDM matrix under solvent-free conditions, or at least substantially solvent-free conditions. As referred to herein, "substantially solvent-free" means that the process is performed with a sufficiently small amount of volatile solvent that, even if the volatile solvent is not removed during manufacture of the insulation, the volatile solvent will not be present in a sufficient amount to violate applicable environmental or safety regulations during manufacture, rocket motor storage, or rocket motor operation due to volatilizing of the solvent. Generally, the term "substantially solvent-free" preferably means not more than about 1 wt % of volatile solvent based on the dry ingredients of the insulation. Preferably, the process is conducted completely free of volatile solvent.

In accordance with a first embodiment of this invention, liquid EPDM is used as a significant portion of the EPDM ingredients introduced into the mixing apparatus. The amount of liquid EPDM ingredient used to ensure adequate distribution of the fibers, without accompanying excessive fragmentation of the fibers, depends upon the mixing apparatus used. Generally, where a conventional mixer known in the insulation industry, such as a sigma-blade mixer, is used to disperse the carbon fibers within the EPDM matrix, the insulation composition preferably contains at least about 50% by weight, and more preferably at least about 90% by weight, liquid EPDM as an ingredient, based on the total weight of the EPDM (i.e., both the solid and liquid EPDM ingredients). Where a vertical blade mixer is used to disperse the carbon fibers within the EPDM matrix, the insulation composition preferably contains slightly more liquid EPDM, such as at least about 90% by weight, and more preferably at least about 95% by weight liquid EPDM as an ingredient, based on the total weight of the EPDM (i.e., both the solid and liquid EPDM ingredients). Where a kneader such as the one illustrated in FIGS. 2-6 is used, even less of the liquid EPDM (or even no liquid EPDM, as detailed in the second embodiment below) is required to obtain homogeneous dispersion of the fibers without excessive fragmentation, i.e., all of the EPDM can be in a solid state when introduced into the kneader.

Generally, the EPDM, i.e., both the solid and liquid ingredients, comprises from about 35 wt % to about 90 wt %, and still more preferably from about 45 wt % to about 75 wt %, of the total weight of the rocket motor insulation. The EPDM terpolymer can be formed from 1,4-hexadiene, dicyclopentadiene, and/or an alkylidene norbornene, such as ethylidene norbornene (ENB), as the diene component. Suitable commercially available liquid EPDM terpolymers are TRILENE® 67A and TRILENE® 77, available through Uniroyal Chemical Company of Middlebury, Conn. It is noted, however, that a portion or all of the liquid EPDM can be substituted for another liquid polymer ingredient, such as liquid polyurethanes, so long as the substituted liquid polymer ingredient obtains the same distributive function with regard to the carbon fibers without excessive fragmentation.

Suitable solid EPDM terpolymers having a 1,4-hexadiene component for use in this invention include NORDEL® 1040, NORDEL® 2522, and NORDEL® 2722E, made by DuPont Dow Elastomers of Wilmington, Del. Suitable solid EPDM terpolymers having an ENB diene component for use in this invention include, without limitation, and as stated above, KELTAN® 4506, KELTAN® 1446A, KELTAN® 2308, each of which is available from DSM Elastomers of the Netherlands, and NORDEL® IP 4520 and NORDEL® IP 4640, both of which are and continue to be available from DuPont Dow Elastomers. agents for cross-linking and/or chain extending polymers or polymer precursors (e.g., prepolymers). Suitable insoluble sulfur curing agents are AKROSPERSE® IS-70 from Akrochem Corporation of Akron, Ohio, and CRYSTEX® OT-20 available through Charles H. Haynes, Inc. Other forms of elemental sulfur can also be used. Suitable peroxide curing agents include dicumyl peroxide, 2,5-dimethyl-2,5-bis-(t-butylperoxy)hexane, 2,5-dimethyl-2,5-bis-(benzoylperoxy)hexane, 2,5-dimethyl-2,5-di(t-butylperoxy)-3-hexane, n-butyl-4,4-bis-(t-butylperoxyl) valerate, 4,4'-methyl-bis-(cyclohexylamine)carbomate, 1,1-bis-(t-butylperoxy)-3,3,5-trimethylcyclohexane, α,α'-bis-(t-butylperoxy)-diisopropylbenzene, 2,5-dimethyl-2,5-bis-(t-butylperoxy)hexyne-3, and t-butyl perbenzoate. A commercially available peroxide is available under the trade name DI-CUP® 40KE, which comprises about 40% dicumyl peroxide on a clay carrier (the clay carrier is available from Burgess Pigment Company of Sandersville, Ga.). Another suitable curing agent (besides sulfur and peroxide curing agents) is bromomethyl alkylated phenolic resin, available as SP-1056 from Schenectady International, Inc. of Schenectady, N.Y.

In typical formulations, the curing agent comprises from about 0.5 phr to about 8 phr and, more preferably, about 2 phr to about 5 phr. As referred to herein and generally accepted in the art, "phr" means parts by weight per one hundred parts by weight polymer.

The curing package preferably also includes at least one phosphate cure accelerator. In the case of a sulfur curing agent, the accelerator can be, by way of example, RHENOCURE® AP-5, RHENOCURE® AP-7, RHENOCURE® AP-3, RHENOCURE® ZADT/G, and RHENOCURE® S/G, which are available from Rhein Chemie Corporation of Trenton, N.J., and Accelerator VS, available from Akrochem Corporation. Additional cure accelerators that may be used in combination with the phosphate cure accelerator include butyl zimate; benzothiazyl disulfide (commercially known as ALTAX®); dithiocarbamate-containing blends (such as AKROFORM® DELTA P.M. from Akrochem Corporation); and sulfides such as dipentamethylenethiuram hexasulfide (such as SULFADS® from R.T. Vanderbilt Company, Inc. of Norwalk, Conn.). While the use of Accelerator VS was initially unacceptable in some formulations because of the foul odor problem it generated, it has also been now found that such formulations can be prepared with no significant odor if about 1.0 phr magnesium oxide is added thereto.

Suitable cure activators for the curing package include metal oxides, such as zinc oxide (e.g., TZFD-88p from Rhein Chemie Corp.), magnesium oxide (e.g., ELASTOMAG® 170 from Morton Chemical Co.), and stearic acid (including palmitic acid), which is available from Harwick Standard Distribution Corp. of Akron, Ohio.

The carbon fibers are fibers which have been subjected to at least partial graphitization or carbonization and preferably have about 98 wt % or more carbon content. The carbon fibers should have lengths suitable for distribution in mixing equipment. Generally, the carbon fibers are preferably noncontinuous and not less than about 1/16 of an inch in length and not more than about 6 inches in length, although these ranges are not exhaustive as to the scope of the invention. Carbon fibers are supplied commercially by several companies, including FORTAFIL® fibers (e.g., FORTAFIL® 140 and FORTA-FIL® 144) from Akzo Nobel of Knoxville, Tenn., carbon fibers available from Amoco of Charleston, S.C., and PANEX® 33 (1/4"×8" or 1/4"×15"), supplied by Zoltek Corporation of St. Louis, Generally, the carbon fibers are present in an amount of from about 2 wt % to about 50 wt %, more preferably from about 10 wt % to about 30 wt %, based on the total weight of the insulation. The amount of carbon fibers will generally vary depending on the presence of other ingredients, such as char-forming agents, especially phosphate fire retardants, which supplement the carbon fibers by imparting desired physical properties to the insulation.

The carbon fibers can be used alone or in combination with other materials affecting the ablative and mechanical properties of the insulation. By way of example, suitable materials include polybenzoxazole fibers, polybenzimidazole fibers, aramid fibers, iron oxide, milled glass, silica, ceramic clay, and the like. Suitable silica particles include HI-SIL® 233 available from PPG Industries, Inc. of Lake Charles, La., and hydrophobized silica particles available from Cabot Corporation of Boston, Mass., as CAB-O-SIL® TS-610, CAB-O-SIL® TG-308F, CAB-O-SIL® TG-720, CAB-O-SIL® TS-500, CAB-O-SIL® TS-530, and CAB-O-SIL® TG-810G; Degussa AG of Germany as AEROSIL® R972, AEROSIL® R974, AEROSIL® R812, AEROSIL® R812S, AEROSIL® R711, AEROSIL® R 504, AEROSIL® R8200, AEROSIL® R805, AEROSIL® R816, AEROSIL® R711, and AEROSIL® R104; and Tulco Inc. of Ayer, Mass., as TULLANOX™ 500.

Suitable additives that may be added as required or desired include one or more of the following, in various combinations: antioxidants, flame retardants, tackifiers, plasticizers, processing aids, carbon black, pigments, and bonding agents.

Representative antioxidants for improving the longevity of the cured elastomer include, by way of example, diphenylamine reacted with acetone, available as BLE®-25 Liquid from Uniroyal Chemical Company; a mixture of mono-, di-, and tri-styrenated phenols, available as AGERITE® SPAR from B.F. Goodrich Chemical Ltd. of Australia. Other suitable antioxidants include polymerized 1,2-dihydro-2,2,4-trimethylquinoline (AGERITE® RESIN D) and mixed octylated diphenylamines (AGERITE® STATLITES), each of which is available from R.T. Vanderbilt Co., Inc.

Fillers that function as flame retardants, or char-forming additives, can be used, if desired, in lesser amounts than most other additives, which makes it easier to formulate the insulation with good mechanical properties. Both inorganic and organic flame retardants are expected to be useful in the present invention. Examples of organic flame retardants include: chlorinated hydrocarbon, available as DECHLO-RANE®, in combination with antimony oxide (optionally with diisodecyl phthalate (DIDP)) or hydrated alumina (such as Hydral 710 aluminum trihydrate); melamine cyanurate; phosphate and phosphate derivatives, available as PHOS-CHEK® P/30 (ammonium polyphosphate) produced by Monsanto Chemical Company of St. Louis, Mo., which can be used alone or in combination with pentaerythritol; DECHLORANE PLUS® 25 from Occidental Chemical Corporation of Niagara Falls, N.Y.; and silicone resin, such as DC4-7051 available through Dow Coming. An example of an inorganic flame retardant is zinc-borate, such as FIRE-BRAKE® ZB from U.S. Borax Inc. of Valencia, Calif.

Examples of suitable tackifiers are WINGTACK® 95 and AKROCHEM® P-133. Other ingredients, such as pigments and extruder processing aids (e.g., ARMEEN® 18-D) well known in the art and/or suitable for use in rocket motor thermal insulation applications and extruder techniques, are intended to be included within the scope of the present invention. A suitable modifying elastomer is chlorosulfonated polyethylene, such as HYPALON®-20 available from DuPont Dow Elastomers. Nonvolatile plasticizers, such as hydrocarbon oil, can also be used.

The casting of the inventive insulation into a case and curing of the inventive insulation may be performed in accordance with techniques known in the art. As referred to herein and in the appended claims, the inventive composition can be, inter alia, either applied by casting into a rocket motor case and then cured, or cured, optionally cut into appropriate geometry and size, and then applied into the rocket motor case.

Referring now more particularly to FIGS. 2-6, the kneader in accordance with a preferred embodiment of this invention is a BUSS® Kneader available through Buss Compounding Systems, AG, a plant engineering group of Georg Fischer Plant Engineering. A representative BUSS® Kneader brand kneader is model MDK/E-46. This kneader is commercially available and is currently believed to have been used in the past in various other industries, including the following: construction; electrical and electronic component parts; automotive parts; chemicals; house appliances; foodstuffs, packaging, and consumer goods. Another similar kneader is available from B&P Process Equipment & Systems.

The BUSS® Kneader brand kneader has a housing module (or barrel) 20 defining a chamber 22. A plurality of additional housing modules (not shown) having respective chambers can be united together to provide an extended chamber. The housing module 20 can be equipped with a jacket or internal fluid passages for heating. In order to allow for ease in maintenance and operation, the housing module 20 can be a split-barrel arrangement to allow opening of the barrel 20 along its length, thereby facilitating access to the chamber 22.

In the illustrated embodiment, a single rotatable screw 24 is received in the chamber 22. Generally, the screw 24 is from about 30 mm to about 200 mm in diameter and has a length-to-diameter (L:D) ratio of from about 8:1 to about 20:1, although this invention is not so limited, given the flexibility of uniting a desired number of housing modules 20.

As shown in FIGS. 2-6, the periphery of the screw 24 has a plurality of screw flights 30. The screw flights 30 each have a rhombic configuration in the illustrated embodiment, although the present invention is not thereby limited in scope. As best shown in FIG. 4, the screw flights 30 are arranged relative to each other to provide a plurality of screw flight columns 32. For each of these screw flight columns 32, the respective screw flights 30 thereof are aligned along the longitudinal axis of the screw 24, yet spaced from each other by an axial distance. In a preferred embodiment, the screw 24 has three screw flight columns 32a, 32b, and 32c. The circumferential centers C of the screw flights 30 of screw flight column 32a are positioned about the circumference at intervals of 120° from the circumferential centers of the screw flights 30 of screw flight columns 32b and 32c. Defined between each of the adjacent columns 32a, 32b, and 32c are gaps 34a, 34b, and 34c. Whereas the screw of a conventional single-screw extruder has a continuous spiral or helical screw face extending along its length, the screw 24 of the illustrated embodiment has a discontinuous screw face, with the spiral or helical path of the screw face being interpreted by the gaps 34a-c (collectively referred to as "gaps 34").

The housing module 20 has kneading pins (also referred to as kneading teeth) 40, which in the illustrated embodiment have diamond-shaped cross sections. Each of the kneading pins 40 extends from an inner periphery thereof along a respective radial direction of the housing module 20. As shown in FIG. 5, the kneading pins 40 collectively define three kneading pin columns 42a, 42b, and 42c, each spaced 120° from each other about the circumference of the screw 24 and dimensioned so as to be receivable in the gaps 34 (see FIG. 4). The kneading teeth 40 can be hollow and connected to a supply means for permitting the injection of fluid constituents through the kneading teeth and directly into the melt.

During operation, the screw 24 is rotated about its longitudinal axis while an axial stroke is superimposed on the screw 24 to oscillate the screw 24 back and forth in the axial direction. A gear box (not shown), also available with the BUSS® Kneader brand kneader through Georg Fischer Plant Engineering, preferably ensures that each revolution of the screw 24 is accompanied by one full forward and backwards stroke of the screw 24. At the same time, the housing module 20 and kneading pins 40 remain stationary relative to the rotating/oscillating screw 24.

Figure 6:
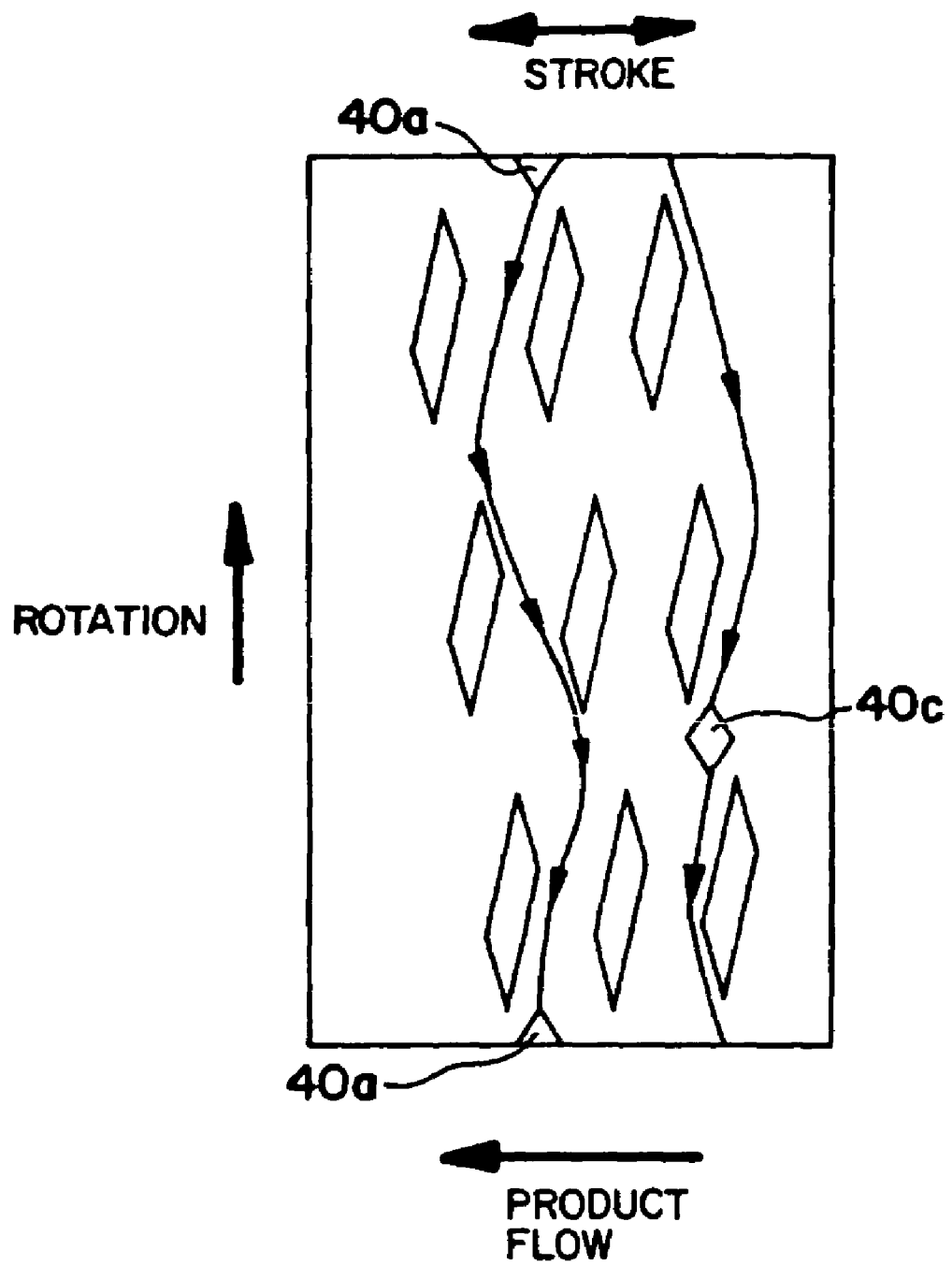
FIG. 6 is the schematic view of FIG. 5, showing the paths of relative movement of selected ones of the kneading pins relative to the discontinuous screw barrel and, in particular, relative to the screw flights of the barrel.

The rotating/oscillating movement of the screw 24 causes the kneading pins 40 to traverse across the faces of respective screw flights 30, thus generating a shear which cleans the faces of the screw flights 30 and effects dispersion and distributive mixing. This relative movement between the screw flights 30 and the kneading pins 40 is explained below in more detail with reference to FIG. 6, which shows selected pins 40a and 40c and their respective paths of movement relative to the screw 24. As shown in FIG. 6, the kneading pins 40 move across the faces of the screw flights 30 and across the gaps 34, thereby cleaning the faces of the screw flights 30 and causing dispersion and distributive mixing to take place.

As mentioned above, a BUSS® Kneader model MDK/E-46 having a 46 mm single screw with a process L:D ratio of 11:1 can be used. This model of kneader can be used in combination with a Reliance 40 HP 1750 rpm DC Motor and Flex Pak 3000 controller.

Vertical feeds can be provided at different axial locations along the length of the housing module 20. Preferably, the inlet feeders are jacketed vertical screw feeders. Generally, the polymeric ingredients and carbon fiber are introduced into the most upstream feed, fire retardants and other additives are added further downstream (along the axial direction of the housing module 20), and the curing package is introduced at the most downstream feed port. In this manner, the insulation composition may be continuously produced. The temperature of the chamber is generally set in the range of from about 66° C. (150° F.) to 93° C. (200° F.) during operation.

An advantage of using the kneader of this second embodiment is that the insulation composition discharged from the kneader can be introduced directly into an extruder for extrusion of the EPDM material. A suitable extruder for use with the kneader of this second embodiment is a discharge extruder GS70. The ability to extrude in this embodiment provides improvements over conventional techniques, in which the insulation composition is calendered into sheets and then cut.

EXAMPLES

The following examples illustrate embodiments which have been made in accordance with the present invention. Also set forth are examples prepared for comparison purposes. The inventive embodiments are not exhaustive or exclusive, but merely representative of the many types of embodiments which may be prepared according to this invention.

TABLE I (all units in parts by weight)

| Ingredient | EXAMPLE | | | | | | COMPARATIVE EXAMPLE | |
|---|---|---|---|---|---|---|---|---|
| | 1 | 2 | 3 | 4 | 5 | 6 | A | B |
| TRILENE ® 67 [liquid EPDM] | 100 | 100 | 100 | 100 | 100 | 100 | 40 | |
| DSM KELTAN ® [solid EPDM] | | | | | | | 50 | |
| NORDEL ® 1040 [solid EPDM] | | | | | | | | 80 |
| Neoprene FB [plasticizer] | | | | | | | | 20 |
| HYPALON ® 20 [polymer] | | | | | | | 10 | |
| PANEX ® 33 × 8 [¼" fibers] | 26 | | | | | | | |
| FORTAFIL ® 144 [carbon fibers] | | 38.5 | 45 | 40.5 | 30 | 25.7 | 26.85 | |
| VCM [carbon fibers] | | | | | | | | 41 |
| AKROCHEM ® P-133 [plasticizer/tackifier] | | | | | | | 5 | |
| AGERITE ® Stalite S [antioxidant] | 2 | 2 | 2 | 2 | 2 | 2 | 2 | 1 |
| AGERITE ® Resin D [antioxidant] | | | | | | | | 2 |
| HI-SIL ® 233 [fire retardant filler/char-forming agent] | 5 | 5 | 5 | 5 | 5 | 5 | 3 | |
| FIREBRAKE ® ZB [fire retardant filler/char-forming agent] | | 19.5 | | | | | | |

TABLE I-continued (all units in parts by weight)

| Ingredient | EXAMPLE 1 | 2 | 3 | 4 | 5 | 6 | COMPARATIVE EXAMPLE A | B |
|---|---|---|---|---|---|---|---|---|
| Hydral 710 Aluminum Trihydrate [filler] | | 19.5 | | | | | | |
| Carbon black [filler] | | | | | | | | 1 |
| DC4-7051 [fire retardant/char-forming agent] | 5 | | | 8.5 | 5 | 5 | 5 | |
| Ferric oxide [filler/pigment] | | | 1.13 | | | | | |
| Antimony oxide (4% DIDP) [fire retardant/filler] | | | 18 | | | | | |
| Dechlorane Plus ® 25 [fire retardant filler/char-forming agent] | | | 45 | | | | | |
| Pentaerythritol PE 200 [fire retardant filler/char-forming agent] | | | | 8.5 | | | | |
| PHOS-CHECK ® P/40 [fire retardant filler/char-forming agent] | | | | 30 | | | | |
| Melamine cyanurate [fire retardant filler/char-forming agent] | 25 | | | | | 25 | 25 | |
| Zinc oxide [activator] | | | | | | | 5 | 5 |
| Kadox 920C zinc oxide [activator] | 5 | 4 | 4 | 4 | 4 | 5 | | |
| ALTAX ® [accelerator] | 1.1 | 1.5 | 1.5 | 1.5 | 1.5 | 1.2 | | |
| Accelerator VS | 2.7 | | | | | | | |
| AKROFORM ® DELTA P.M. [accelerator] | | 0.3 | 0.3 | 0.3 | 0.3 | 0.25 | | |
| SULFADS ® [accelerator] | | 0.82 | 0.82 | 0.82 | 0.82 | 0.82 | | 0.75 |
| Butyl zimate [accelerator] | | | | | | | 0.5 | |
| RHENOCURE ® AP-5 [accelerator] | | | | | | | 3.5 | |
| CRYSTEX ® OT-20 [curative] | 1.05 | 1.22 | 1.22 | 1.22 | 1.22 | 1.22 | | |
| SP-1056 [curative] | | | | | | | 1.1 | |
| CAPTAX ® [accelerator] | | | | | | | | 1 |
| TELLURAC ® [accelerator] | | | | | | | | 0.5 |
| Sulfur [curative] | | | | | | | | 1 |
| Total Parts by Weight | 172.8 | 192.3 | 223.9 | 202.3 | 149.8 | 171.2 | 178.95 | 153.25 |

Examples 1 and 6

All solid ingredients, with the exception of the TRILENE® 67, were blended in a V-shell blender at ambient temperature over several hours. The TRILENE® 67 was separately introduced into a Brabender mixer equipped with a sigma blade operating at 10 rpm and set to 60° C. (140°F.). The TRILENE® 67 was mixed in the Brabender mixer for a sufficient amount of time to warm the TRILENE® 67 to 60°C. Next, the blended material from the V-shell blender was introduced into the Brabender mixer and allowed to mix with the TRILENE® 67 until the fibers were uniformly dispersed in the TRILENE® 67. The formulation was then dumped from the Brabender mixer to a mill for shaping into sheets before cooling. Each sheet was about 1.27 cm (0.5 inch) in thickness.

Examples 2 Through 5

All solid ingredients, with the exception of the TRILENE® 67 and the carbon fibers, were blended in a V-shell blender at ambient temperature over several hours. The TRILENE® 67 was separately introduced into a Brabender mixer equipped with a sigma blade operating at 50 rpm and set to 77° C. (170°F.). The TRILENE® 67 was mixed in the Brabender mixer for a sufficient amount of time to warm the TRILENE® 67 to 77°C. Next, the blended material from the V-shell blender was introduced into the Brabender mixer and allowed to mix with the TRILENE® 67. The speed of the Brabender mixer was then slowed to 20 rpm, and the fibers were introduced into the Brabender mixer and mixed until the fibers were uniformly dispersed in the TRILENE® 67. The formulation was then dumped from the Brabender mixer to a mill for shaping into sheets before cooling. Each sheet was about 1.27 cm (0.5 inch) in thickness.

Comparative Examples A and B

Comparative Example A was prepared by mixing all of the ingredients, with the exception of the carbon fiber, in a laboratory mixer. The carbon fiber was incorporated into this mixture in a twin screw extruder (containing counter-rotating screws) by adding the mixed polymeric material and the carbon fibers in a single port of the twin screw extruder. Comparative Example B was made by solvent processing with a hydrocarbon solvent.

TABLE II

|  | EXAMPLE | | | | | | Comparative Example | |
|---|---|---|---|---|---|---|---|---|
|  | 1 | 2 | 3 | 4 | 5 | 6 | A | B |
| Average Ablation Rate for Lower Section (mm/s) | 3.29 | 3.98 | 4.89 | 3.96 | 4.05 | 3.31 | 3.37 | 3.45 |
| Average Ablation Rate for Middle Section (mm/s) | 12.34 | 9.36 | 12.63 | 9.97 | 12.97 | 11.80 | 16.96 | 12.76 |
| Average Ablation Rate for Upper Section (mm/s) | 23.44 | 14.12 | 12.72 | 12.79 | 20.45 | 17.94 | 35.23 | 18.13 |

From Table II, it is seen that the inventive examples containing liquid EPDM as their exclusive EPDM ingredient (i.e., no solid EPDM) exhibited comparative and, in some instances, improved ablative properties to Comparative Example A (containing less than half liquid EPDM based on the total weight of EPDM ingredients) and Comparative Example B (containing no liquid EPDM).

Examples 7 through 9 were prepared in accordance with a second embodiment of this invention by kneading the insulation in a BUSS® Kneader. The ingredients of the insulation compositions of Examples 7 through 9 are set forth below in Table III. The ablative properties of Examples 7 through 9, a comparison of these properties to that of inventive Example 4, are set forth below in Table IV.

TABLE III (all units in parts by weight)

|  | EXAMPLE | | |
|---|---|---|---|
| Ingredient | 7 | 8 | 9 |
| DSM KELTAN ® 1446A [solid EPDM] | 100 | 100 | 100 |
| FORTAFIL ® 243 [carbon fibers] | 40.52 | 44.45 | 55.55 |
| Cure/Filler | 14.86 | 14.88 | 14.88 |
| Fire Retardant | 47.02 | 62.72 | 51.62 |
| Total Parts by Weight | 202.40 | 222.05 | 222.05 |

TABLE IV

|  | EXAMPLE | | | |
|---|---|---|---|---|
|  | 7 | 8 | 9 | 4 |
| Average Ablation Rate for Lower Section (mm/s) | 3.68 | 2.85 | 3.44 | 3.35 |
| Average Ablation Rate for Middle Section (mm/s) | 9.41 | 8.97 | 9.79 | 9.40 |
| Average Ablation Rate for Upper Section (mm/s) | 15.42 | 14.75 | 13.61 | 11.64 |

As shown by Table IV, the insulation prepared in a BUSS® Kneader without any liquid EPDM exhibited comparable erosion resistance to Example 4, which was prepared in a sigma mixer with liquid EPDM.

Figure 7:
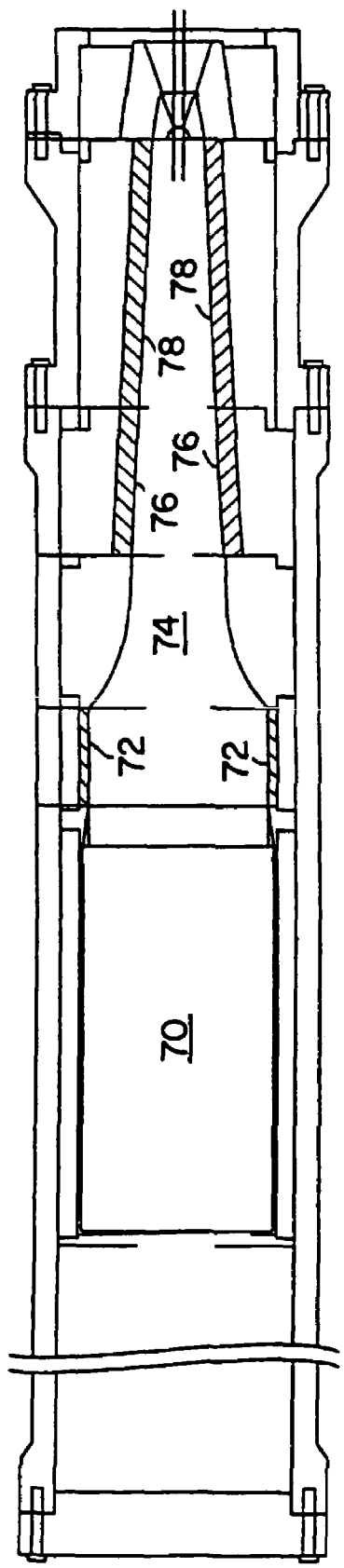
FIG. 7 is a schematic, cross-sectional view of a char motor used in testing examples discussed hereinbelow.

The tests were performed in a char motor, such as the one illustrated in FIG. 7. Char motors are constructed to evaluate the ablative properties of solid rocket motor case insulation materials. A char motor includes a propellant beaker 70 to provide the combustion gases, evaluation chambers to hold the test materials, and a constricting nozzle to produce the required pressure. The evaluation chamber is divided into three sections. The first one is a "low-velocity" cylindrical region 72 about eight inches long and eight inches in diameter (approximately the same diameter as the propellant beaker 70). A short conical transition chamber 74 constricts the gas flow into a diameter of about two inches and vents the propellant gases into a 22-inch long conical test chamber. This test chamber is divided into the "mid-velocity" region 76 and "high-velocity" region 78.

Samples of insulation material to be evaluated are molded, cured, and bonded with epoxy into each of the test chambers. Prior to assembly, the cured length is determined and the thickness of each evaluation material is measured at selected intervals, nominally one inch apart. Each sample is also weighed. The samples are then assembled into the low-velocity section, the mid-velocity section, and the high-velocity section. After firing, the motor is disassembled and each sample is measured again. The ablation rate is determined by subtracting the post-fired thickness of the insulation (i.e., after the char had been removed) at a given point from the prefired thickness and dividing the result by the bum time of the motor. For these tests, more than one section of material was measured, and the average of all of the sections is reported above.

The char motors were fired with RSRM TP-H1148 (polybutadieneacrylic acid acrylonitrile (PBAN-based)) propellant.

For Examples 1 through 3 and comparative Example A set forth in Tables I and II, the motor was fired for 12.10 seconds at an average pressure of 880 psi. For Examples 4 through 6 set forth in Tables I and II, the motor was fired for 11.56 seconds at an average pressure of 825 psi. Comparative Example B was fired for 11.89 seconds at an average pressure of 885 psi. For Examples 7 through 9 and 4 set forth in Tables III and IV, the motor was fired for 12.46 seconds at an average pressure of 916.07 psi.

The foregoing detailed description of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A method of insulating a case of a rocket motor loaded with a solid propellant, comprising:
providing a kneader comprising at least one housing module provided with a chamber, a plurality of kneader pins extending radially into the chamber from the at least one housing module, and a screw which is rotatable about a longitudinal axis thereof and movable along the longitudinal axis in a reciprocating motion, the screw having a peripheral surface including a plurality of screw flights arranged to collectively define a discontinuous screw thread extending along the longitudinal axis of the screw;
preparing insulation from a composition comprising at least one cross-linkable polymer and carbon fibers by introducing the composition into the kneader and rotating the screw along the longitudinal axis thereof while superimposing the longitudinal reciprocating motion to the screw under substantially solvent-free conditions;
curing the composition to form the insulation; and
insulating a case of a rocket motor with the insulation.

2. A method of insulating a case of a rocket motor loaded with a solid propellant, comprising:
providing a kneader comprising a plurality of kneader pins extending radially into a chamber of at least one housing module of the kneader and a screw, the screw rotatable about a longitudinal axis thereof and movable along the longitudinal axis in a reciprocating motion and the screw having a peripheral surface including a plurality of screw flights arranged to collectively define a discontinuous screw thread extending along the longitudinal axis of the screw;
preparing insulation from a composition comprising at least one cross-linkable ethylene propylene diene monomer ("EPDM") terpolymer and carbon fibers by rotating the screw along the longitudinal axis thereof while superimposing an axially reciprocating motion to the screw to mix the composition under substantially solvent-free conditions;
curing the composition to form the insulation; and
insulating a case of a rocket motor with the insulation.

3. The method of claim 2, wherein insulating a case of a rocket motor comprises applying the insulation to an interior surface of the case and interposing the insulation between the interior surface and a solid propellant.

4. The method of claim 2, wherein preparing insulation from a composition comprising at least one cross-linkable EPDM terpolymer and carbon fibers comprises preparing the insulation from a composition comprising 100 weight percent of a cross-linkable liquid EPDM terpolymer and the carbon fibers.

5. The method of claim 2, wherein preparing insulation from a composition comprising at least one cross-linkable EPDM terpolymer and carbon fibers comprises preparing the insulation from a composition comprising at least about 90 weight percent of a cross-linkable liquid EPDM terpolymer and the carbon fibers.

6. The method of claim 2, wherein preparing insulation from a composition comprising at least one cross-linkable EPDM terpolymer and carbon fibers comprises preparing the insulation from a composition comprising at least about 50 weight percent of a cross-linkable liquid EPDM terpolymer and the carbon fibers.

7. The method of claim 2, wherein preparing insulation from a composition comprising at least one cross-linkable EPDM terpolymer and carbon fibers comprises preparing the insulation from a composition that is free of a cross-linkable liquid EPDM terpolymer.

8. The method of claim 2, wherein preparing insulation from a composition comprising at least one cross-linkable EPDM terpolymer and carbon fibers comprises preparing the composition from dry ingredients under conditions in which the composition comprises not more than about 5 weight percent of volatile solvent based on the dry ingredients in the composition.

9. The method of claim 2, wherein preparing insulation from a composition comprising at least one cross-linkable EPDM terpolymer and carbon fibers comprises mixing the composition in the kneader in the absence of any volatile solvent.

10. A method of insulating a case of a rocket motor loaded with a solid propellant, comprising:
providing a kneader comprising a chamber, a plurality of kneader pins extending radially into the chamber, and a screw which is rotatable about a longitudinal axis thereof and movable along the longitudinal axis in a reciprocating motion, the screw having a peripheral surface comprising a plurality of screw flights arranged to collectively define a discontinuous screw thread extending along the longitudinal axis of the screw;
rotating the screw along the longitudinal axis thereof while superimposing an axial, oscillating motion to the screw to mix a composition comprising at least one cross-linkable polymer and carbon fibers in the kneader under substantially solvent-free conditions;
curing the composition to form insulation; and
insulating a case of a rocket motor with the insulation.

11. The method of claim 1, wherein preparing insulation from a composition comprising at least one cross-linkable polymer and carbon fibers comprises preparing the insulation from a composition comprising carbon fibers including a carbon content of greater than about 98 weight percent.

* * * * *

UNITED STATES PATENT AND TRADEMARK OFFICE
CERTIFICATE OF CORRECTION

Page 1 of 1

PATENT NO. : 7,410,607 B2
APPLICATION NO. : 10/938446
DATED : August 12, 2008
INVENTOR(S) : David G. Guillot It is certified that error appears in the above-identified patent and that said Letters Patent is hereby corrected as shown below:

On the title page:
In ITEM (56) References Cited
  OTHER PUBLICATIONS
  Page 1, 2$^{nd}$ column, 1$^{st}$ line of the
    2$^{nd}$ entry (line 13),  insert --Buss Kneader MKS Modular Series"
                               Flexible systems featuring high process reliability for
                               cost-effective compounding solutions, brochure,
                               Buss (America), Inc., Bloomingdale, Illinois
                               (Undated)--

In the specification:
  COLUMN 1, LINE 53,   change "grain bums." to --grain burns.--
  COLUMN 7, LINE 9,    change "St. Louis, Generally," to
                       --St. Louis, Missouri. Generally,--
  COLUMN 7, LINE 65,   change "Dow Coming." to --Dow Corning.--

Signed and Sealed this
Twelfth Day of January, 2016

Michelle K. Lee
*Director of the United States Patent and Trademark Office*